United States Patent
Farricker

(10) Patent No.: US 9,084,267 B2
(45) Date of Patent: *Jul. 14, 2015

(54) WLAN CHANNEL ALLOCATION

(71) Applicant: THE BOEING COMPANY, Chicago, IL (US)

(72) Inventor: James T. Farricker, North Bend, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,346

(22) Filed: Jul. 31, 2014

(65) Prior Publication Data

US 2014/0341158 A1     Nov. 20, 2014

Related U.S. Application Data

(63) Continuation of application No. 13/557,686, filed on Jul. 25, 2012, now Pat. No. 8,830,976.

(51) Int. Cl.
| | |
|---|---|
| *H04Q 7/00* | (2006.01) |
| *H04W 72/06* | (2009.01) |
| *H04W 16/14* | (2009.01) |
| *H04W 60/00* | (2009.01) |
| *H04W 28/26* | (2009.01) |
| *H04W 8/20* | (2009.01) |
| *H04W 16/12* | (2009.01) |
| *H04W 84/12* | (2009.01) |

(52) U.S. Cl.
CPC .............. *H04W 72/06* (2013.01); *H04W 8/205* (2013.01); *H04W 16/14* (2013.01); *H04W 28/26* (2013.01); *H04W 60/00* (2013.01); *H04W 16/12* (2013.01); *H04W 84/12* (2013.01)

(58) Field of Classification Search
USPC .......................... 370/401, 338, 329; 455/450
See application file for complete search history.

(56) References Cited

U.S. PATENT DOCUMENTS

| | | | |
|---|---|---|---|
| 7,664,081 B2 | 2/2010 | Luoma et al. | |
| 7,940,791 B2 | 5/2011 | Farricker et al. | |
| 8,428,036 B2 | 4/2013 | Herscovici et al. | |
| 8,830,976 B2 * | 9/2014 | Farricker | 370/338 |
| 2004/0121749 A1 | 6/2004 | Cui et al. | |
| 2004/0125779 A1 * | 7/2004 | Kelton et al. | 370/338 |
| 2005/0070279 A1 | 3/2005 | Ginzburg et al. | |
| 2006/0268764 A1 | 11/2006 | Harris | |
| 2010/0238871 A1 | 9/2010 | Tosic et al. | |
| 2011/0026441 A1 | 2/2011 | Diener et al. | |
| 2011/0116459 A1 | 5/2011 | Lee et al. | |
| 2012/0093092 A1 * | 4/2012 | Kasslin et al. | 370/329 |

OTHER PUBLICATIONS

European Search Report for Application No. 13174787.5-1505, dated Jan. 29, 2014, 5 pages.

* cited by examiner

*Primary Examiner* — Duc C Ho
(74) *Attorney, Agent, or Firm* — Toler Law Group, PC

(57) ABSTRACT

A method includes reserving, at a wireless local area network (WLAN) controller, a first reserved communication channel from a plurality of communication channels available for use in a wireless network. The first reserved communication channel is withheld from a dynamic channel allocation process. The method includes receiving, at the WLAN controller, a request from a first device for access to the wireless network. The method further includes allocating the first reserved communication channel to the first device in response to a determination that the first device is included in a list of registered devices.

20 Claims, 6 Drawing Sheets

| Network Identifier | Bandwidth Request | Channel |
|---|---|---|
| N19dfxlm830kdoc94kM | 28 mbs | 11 |
| P4xid084komw9kdm04 | 42 mbs | 14 |
| ... | ... | ... |
| I904mso05kibi5052maj | 28 kbs | 11 |

WLAN CHANNEL ALLOCATION

CROSS REFERENCE TO RELATED APPLICATIONS

This application is a continuation of and claims priority from U.S. patent application Ser. No. 13/557,686, filed Jul. 25, 2012 and entitled "WLAN CHANNEL ALLOCATION," which is hereby incorporated by reference in its entirety.

BACKGROUND

The subject matter described herein relates to communication networks, and more particularly to techniques for channel allocation in wireless local area networking.

A wireless local area network (WLAN) deployed in a business or enterprise environment comprises numerous access point (AP) devices, each of which may be positioned in or near a building to provide network access to wireless client devices. Wireless communication by devices in the WLAN may be made in one or more frequency bands. Each AP device deployed in a WLAN must be assigned to a certain channel for operation in a frequency band of operation.

Wireless communication by devices in the WLAN may be implemented in one or more frequency bands. In the United States WLANs commonly use two unlicensed frequency bands in the 2.4 GHz and the 5 GHz spectrum. Some AP devices designed for enterprise deployment can simultaneously operate in both the 2.4 GHz and 5 GHz frequency bands. Such AP devices have two radio transceivers and are referred to as "dual-band AP devices", indicating that they have a 2.4 GHz radio transceiver and a 5 GHz radio transceiver. In operation, AP devices exchange information about adjacent AP devices, RF channels and received signal strength indicators (RSSI). This information may be used by a WLAN controller to provision AP devices and to assign RF channels and power levels to AP devices to help reduce the potential co-channel interference.

In networking environments such as complex manufacturing environments, new innovations that utilize unique wireless networking resources or security settings may be assigned a specific service set identifier (SSID). This requires extensive process and intervention for devices which are not part of the general enterprise WLAN yet bring significant productivity gains (Process, Cycle Time, Cost Savings) to Factory Floor/Production—Equipment Engineering organizations. Accordingly, systems and methods to manage WLAN channel allocation may find utility.

SUMMARY

Systems and methods for WLAN channel allocation in communication networks are disclosed. In one embodiment, a computer-based method to manage wireless network resources in a wireless local area (WLAN) controller comprises maintaining, in a memory coupled to the controller, a list of specified service set identifier (SSID) devices, maintaining a plurality of communication channels available for use in a wireless network environment, defining at least a first reserved communication channel from the plurality of communication channels, receiving a request from an SSID device for access to wireless network resources managed by the WLAN controller, and allocating the at least a first reserved communication channel to the SSID device when the SSID device is on the list of specified SSID devices.

In another embodiment, a WLAN controller comprises a processor and logic instructions stored in a tangible computer-readable medium coupled to the processor which, when executed by the processor, configure the processor to maintain, in a memory coupled to the controller, a list of specified service set identifier (SSID) devices, maintain a plurality of communication channels available for use in a wireless network environment, define at least a first reserved communication channel from the plurality of communication channels, receive a request from an SSID device for access to wireless network resources managed by the WLAN controller, and allocate the at least a first reserved communication channel to the SSID device when the SSID device is on the list of specified SSID devices.

In another embodiment, a computer program product comprising logic instructions stored in a tangible computer-readable medium coupled to a processor which, when executed by the processor, configure the processor to maintain, in a memory coupled to the controller, a list of specified service set identifier (SSID) devices, maintain a plurality of communication channels available for use in a wireless network environment, define at least a first reserved communication channel from the plurality of communication channels, receive a request from an SSID device for access to wireless network resources managed by the WLAN controller, and allocate the at least a first reserved communication channel to the SSID device when the SSID device is on the list of specified SSID devices.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods, systems, and computer program products in accordance with the teachings of the present disclosure are described in detail below with reference to the following drawings.

DETAILED DESCRIPTION

Systems and methods for WLAN channel allocation are described herein. Specific details of certain embodiments are set forth in the following description and figures to provide a thorough understanding of such embodiments. One skilled in the art will understand, however, that alternate embodiments may be practiced without several of the details described in the following description.

Various embodiments described here are set in the context of wireless networking in a complex environment. In some embodiments wireless networks may be implemented in an enterprise setting such as a manufacturing environment or the like. In other embodiments wireless networks may be implemented in an educational setting or in a trading setting, such as a stock or commodities trading facility. In some embodiments a WLAN controller may reserve one or more communication channels such that the reserved communication channel(s) are not available for assignment during conventional dynamic channel allocation procedures implemented by the WLAN controller. Further, the WLAN controller may implement a registration process whereby radios/access point devices with wireless communication capability may register is network identifier (e.g., SSID) with the WLAN controller for access to a dedicated communication channel. In operation, when the WLAN controller receives a network services request from a wireless device, the network identifier of the device which launched the request is checked against a list of registered devices and if the requesting device is registered then the WLAN controller may allocate the requesting device to a reserved communication channel.

Figure 1:
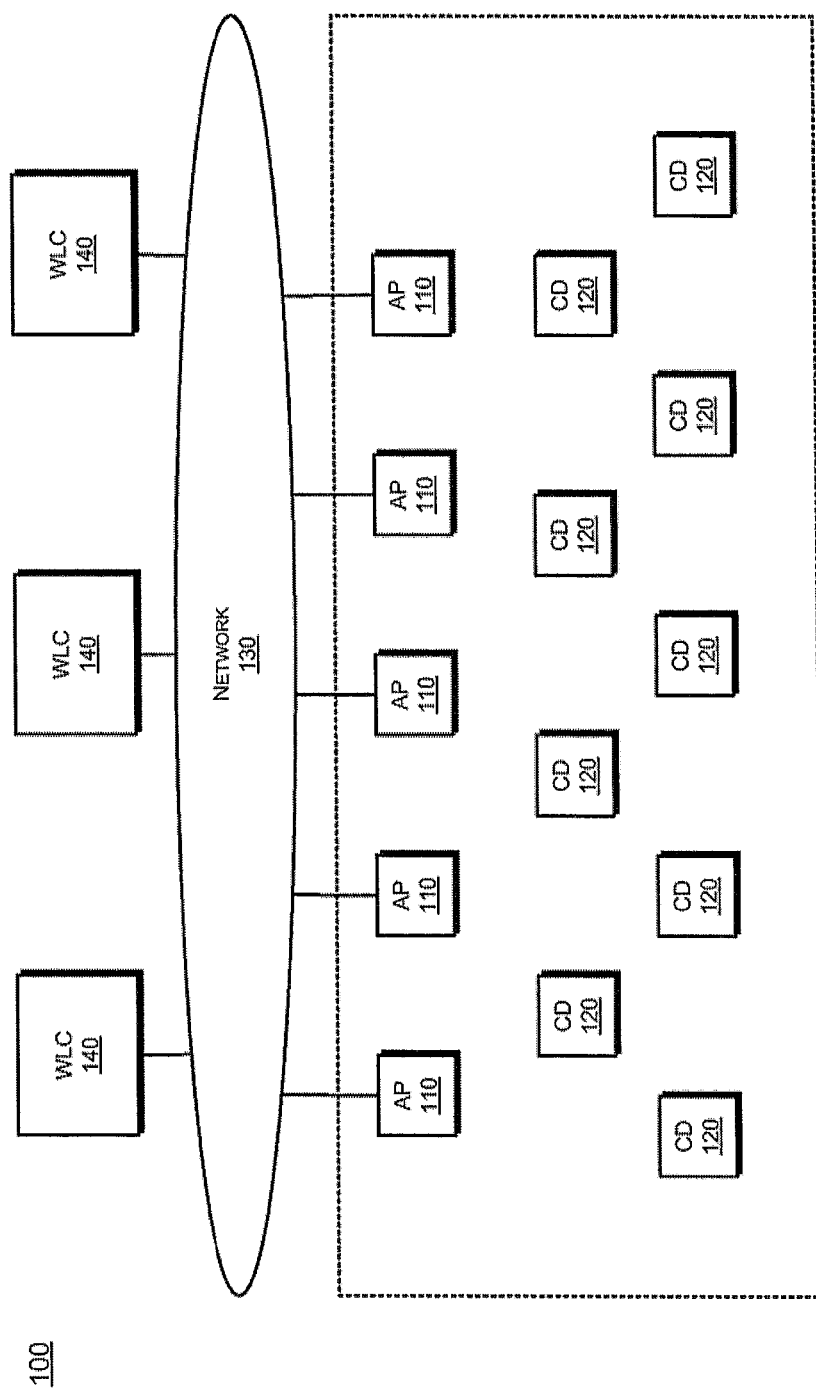
FIG. 1 is a schematic illustration of a wireless communication networking environment in which WLAN channel allocation may be implemented, according to embodiments.

FIG. 1 is a schematic illustration of a wireless communication networking environment in which WLAN channel allocation may be implemented, according to embodiments. Referring to FIG. 1, in brief overview in one embodiment a WLAN environment 100 may comprise a plurality of access point (AP) devices 110 coupled to a network 130. Each AP device 110 may provide wireless network access to one or more wireless client devices (CDs) 120 that operate in the WLAN environment 100. WLAN environment 100 may contain a plurality of SSIDs.

WLAN controllers 140 are coupled to the network 130. The controllers 140 manage one or more AP devices 110, e.g., by assigning a transmission channel to each AP device in its group. In general, each AP device may be assigned to operate on a different channel. Wireless communication by devices in the WLAN may take place made in one or more frequency bands, e.g., unlicensed frequency bands, such as in the 2.4 GHz and in the 5 GHz unlicensed bands in the United States. Each frequency band may comprise multiple communication channels. There are many factors that may affect the performance of an AP device 110 in a wireless network. Examples of such factors include RF interference occurring in any channel from wireless devices that are part of another WLAN and RF energy from devices that are not WLAN devices (e.g., Bluetooth devices, microwave ovens, digital cordless telephones, etc.). In addition, an AP device in the WLAN may contend for use of a channel with another AP device in the WLAN.

In operation, at the time of initial deployment of the WLAN environment 100, and then on a periodic or on-demand basis thereafter, the controllers 140 may perform a dynamic channel assignment (DCA) process whereby channels for AP devices 110 are assigned based on various factors as described above. Thus, after the initial deployment of the WLAN environment 100 is made, the AP devices 110 continuously monitor the RF environment and supply data representing the quality of their respective RF environments to a corresponding plurality of WLAN controllers 140.

Figure 2:
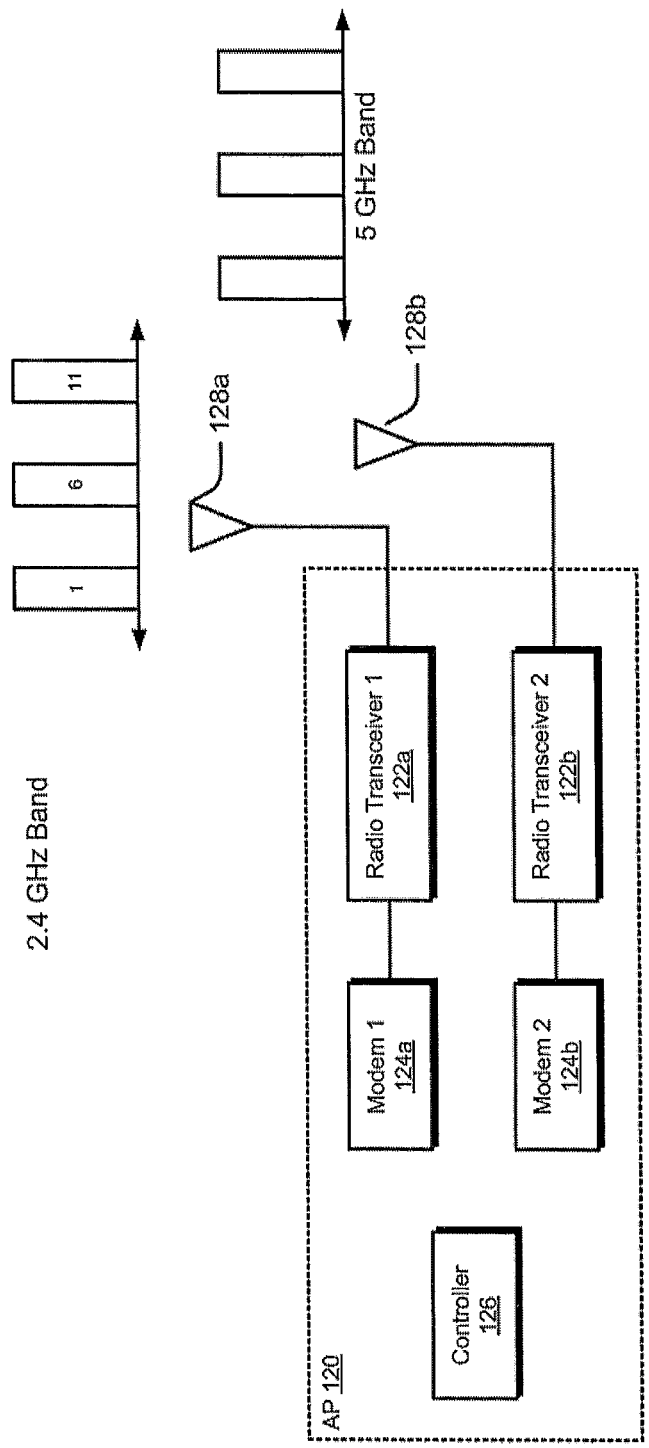
FIG. 2 is a schematic illustration of a wireless networking access point device in a wireless network in environment in which WLAN channel allocation may be implemented in accordance with some embodiments.

FIG. 2 is a schematic illustration of a wireless networking access point device 120 in a wireless network in environment in which WLAN channel allocation may be implemented in accordance with some embodiments. Turning now to FIG. 2, an AP device 120 represents the block diagram of any AP device 120 shown in FIG. 1. The AP device 120 may be configured to serve wireless communication simultaneously in two different bands, e.g., the 2.4 GHz band and the 5 GHz band. To this end, the AP device 120 comprises a first radio transceiver 122a and a corresponding modem 124a. The first radio transceiver 122a transmits and receives RF signals via antenna 128a. Similarly, there is a second radio transceiver 122b and a corresponding modem 124b, and the second radio transceiver 122b transmits and receives signals via antenna 128b.

By way of example, the radio transceiver 122a and modem 124a may be part of a WLAN chipset that is configured to serve wireless communication on channels in the 2.4 GHz band and the radio transceiver 122b and modem 124b may be part of a WLAN chipset that is configured to serve wireless communication on channels in the 5 GHz band. A controller 126 controls the two communication channel components in the AP device 120. For example, the controller 126 may be implemented a microprocessor, digital signal processor, application specific integrated circuit (ASIC) (comprising programmable or fixed digital logic gates) that is configured to perform a variety of control functions. In addition, the controller 126 may be configured to control the radio transceivers 122a and 122b and modems 124a and 124b to capture data from these components in order to compute data related to the "air quality" factors for each channel shown in FIG. 2.

When reference is made herein to a channel of an AP device, it is to be understood that this refers to a channel used by one of possible several radio transceivers in an AP device since an AP device may have multi-band service capability as depicted in FIG. 2. Thus, an AP device may be assigned different channels (in different frequency bands) for each of its different band-specific radio transceivers.

Figures 3, 5:
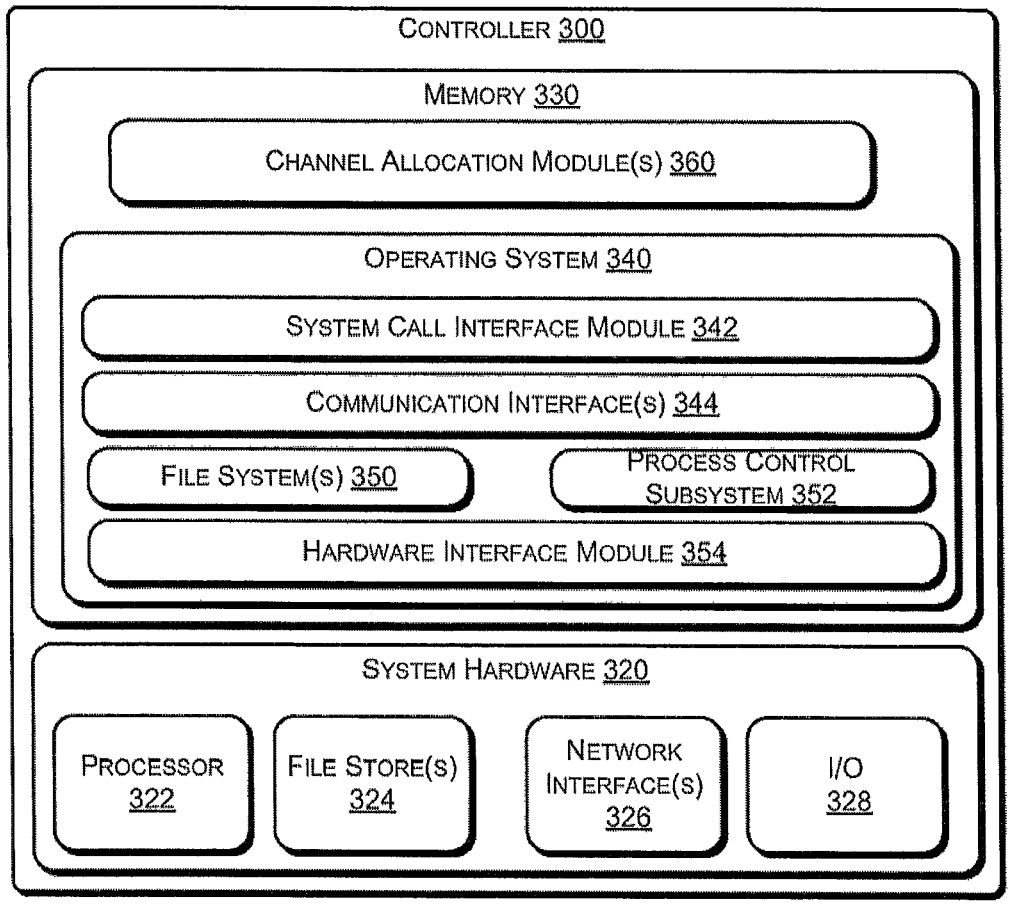
FIG. 3 is a schematic illustration of a wireless networking controller device which may be adapted to implement a system and method for WLAN channel allocation in accordance with some embodiments.
FIG. 5 is a schematic illustration of a memory table in a WLAN controller, according to embodiments.

In some embodiments both the WLAN controller 140 depicted in FIG. 1 may be implemented in a computer-based networking equipment. FIG. 3 is a schematic illustration of a WLAN controller 300 which may be adapted to implement any of the WLAN controllers 140 depicted in FIG. 1. In one embodiment, controller 300 includes system hardware 320 and memory 330, which may be implemented as random access memory and/or read-only memory.

System hardware 320 may include one or more processors 322, one or more file store(s) 324, network interface(s) 326, and input/output mechanisms 328. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

File store(s) 324 may be communicatively coupled to processor 322. File store(s) 324 may be internal to controller 300 such as, e.g., one or more hard drives, CD-ROM drives, DVD-ROM drives, or other types of storage devices. File store(s) 324 may also be external to controller 300 such as, e.g., one or more external hard drives, network attached storage, or a separate storage network.

In one embodiment, network interface(s) 326 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

In one embodiment, input/output devices 328 may including a display having a screen, one or more speakers, a keyboard, a mouse, a touch screen, a voice-activated input device, a track ball, and any other device that allows the controller 300 to receive input from a user.

Memory 330 may include an operating system 340 for managing operations of controller 300. In one embodiment, operating system 300 includes a hardware interface module 354 that provides an interface to system hardware 320. In addition, operating system 340 may include a file system 350 that manages files used in the operation of controller 300 and a process control subsystem 352 that manages processes executing on controller 300.

Operating system 340 may include (or manage) one or more communication interfaces 344 that may operate in conjunction with system hardware 320 to transceive data packets and/or data streams from a remote source. Operating system 340 may further include a system call interface module 342 that provides an interface between the operating system 340 and one or more application modules resident in memory 330. Operating system 340 may be embodied as a Windows® brand operating system or as a UNIX operating system or any derivative thereof (e.g., Linux, Solaris, etc.), or other operating systems.

In one embodiment, memory 330 includes a channel allocation module 360, which may include logic instructions encoded in a tangible computer-readable medium which, when executed by processor(s) 322, cause the processor(s) 322 to implement channel allocation operations in the access points 110 coupled to the controller 300. In conventional operations, channel allocation decisions may be implemented using signal strength indicators such as, e.g., a received signal strength indicator (RSSI) parameter or another signal strength indicator between access points 110 and the controller 300. By way of example, the processor(s) 322 may be configured to utilize a channel allocation algorithm based on RSSI or other signal measurement to manage a plurality of reserved communications channels dedicated to operating the designated SSID devices while concurrently managing one or more communications channels allocated dynamically to a non-reserved allocation.

Figure 4:
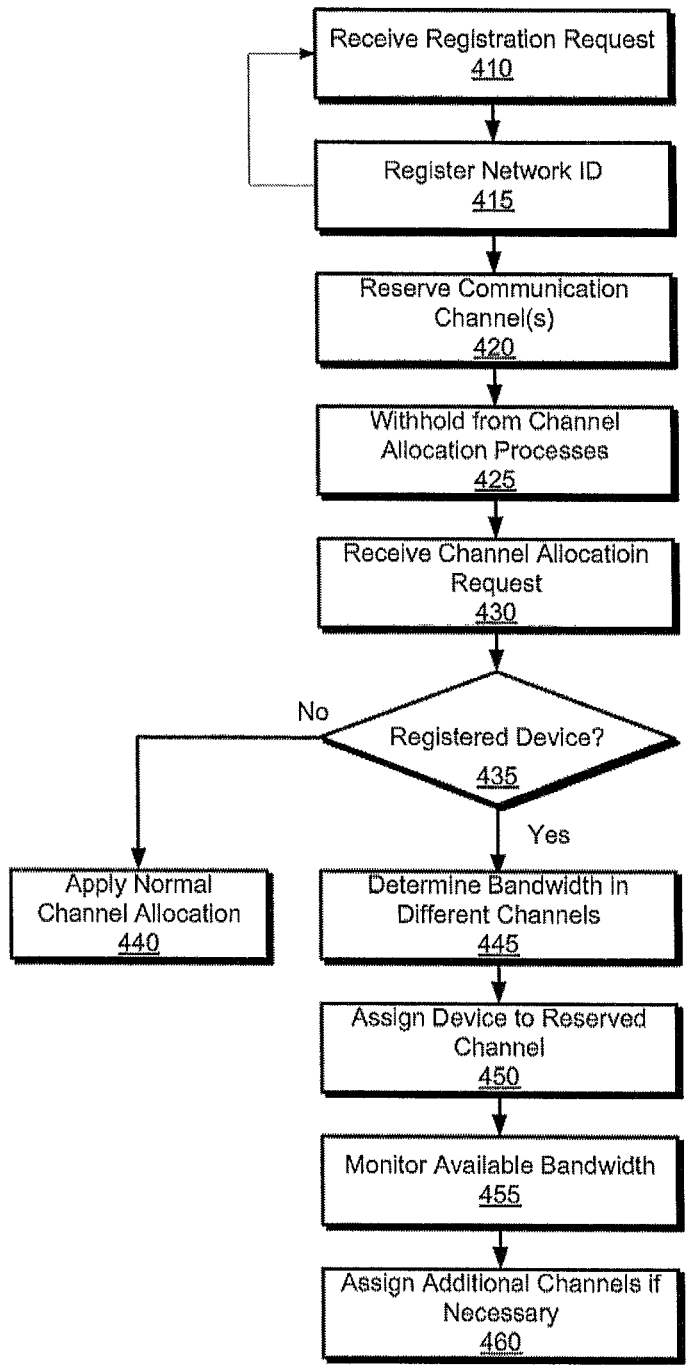
FIG. 4 is a flowchart illustrating operations in a method for WLAN channel allocation according to embodiments.

FIG. 4 is a flowchart illustrating operations in a method for channel allocation according to embodiments. By way of example, in some embodiments the operations implemented by the controller 300 implements a registration process by which devices may register with the controller to receive a reserved communication channel. Further, the operations reserve a pool of one or more channels which are withheld from dynamic channel allocation processes implemented by the controller 300. In operation, when channel resources are allocated requests for channel resources from registered devices may be assigned to one or more of the reserved communication channels, thereby bypassing dynamic channel allocation procedures. Furthermore, the reserved communication channels may be applied to specific organizations within an enterprise. By way of example, a first reserved communication channel may be applied to one of multiple organizations within an enterprise, or multiple organizations within the enterprise may be allowed to communicate with the WLAN controller via the first reserved communication channel.

Referring to FIG. 4, at operation 410 a registration request is received in the controller. By way of example, in some embodiments the registration request may be received from a device which includes a network identifier such as an SSID. Each device may include and be associated with a bandwidth requirement. The registration request may further include a bandwidth request. At operation 415 the network identifier associated with the registration request is registered with the controller 300. By way of example, referring to FIG. 5, in some embodiments the controller 300 may maintain a table in memory which records the device(s) which have initiated registration requests with the controller 300. The table may include the network identifier and may also record the requested bandwidth. In some embodiments the controller monitors for registration requests, such that operations 410-415 may be repeated each time a registration request is received, thereby constructing a data table in memory which records network identifiers of devices which request dedicated communication channels.

At operation 420 the controller reserves one or more communication channels. By way of example, in some embodiments the WLAN networking environment 100 depicted in FIG. 1 may operate in accordance with the IEEE 802.11 family of communication standards. In such embodiments the controller 300 may define one or more channels from either the 2.4 GHz frequency band or the 5 GHz band as reserved communication channels. In further embodiments, the controller 300 may select communication channels which are non-adjacent as reserved channels, such that reserved channels do not create co-channel interference when implemented. By way of example, a plurality of non-overlapping reserved communication channels may be defined.

At operation 425 the controller withholds the reserved channel(s) from normal channel allocation processes implemented by the controller 300. By way of example, controller 300 may implement dynamic channel allocation processes to manage bandwidth allocation in the WLAN environment 100. Any communication channels designated as reserved by the controller 300 would be exempted from such channel allocation processes.

At operation 430 a communication channel allocation request is received, and at operation 435 the controller 300 determines whether the request was originated by a registered device. By way of example, in some embodiments the channel allocation request includes the network identifier of the device which originated the request, and the controller 300 may check the memory table depicted in FIG. 5 to determine whether the requesting device is registered with the controller 300.

If, at operation 435, the requesting device is not a registered device then control passes to operation 440 and conventional channel allocation processes are applied by the controller 300 to accommodate the request. By contrast, if at operation 435 the requesting device is a registered device then control passes to operation 445 and the controller 300 determines an available bandwidth one or more reserved communication channels and at operation 450 the controller assigns the device to a reserved communication channel. In some embodiments the requesting device may be assigned to a communication channel which has sufficient bandwidth available to accommodate the bandwidth request associated with the requesting device.

At operation 455 the controller 300 monitors the available bandwidth in the reserved communication channel assigned to the requesting device, and at operation 460 the controller 300 may assign additional communication channels from the pool of reserved communication channels to the requesting device if the bandwidth available in the reserved channel assigned in operation 450 is inadequate to accommodate the bandwidth requirements of the requesting device. In addition, the controller 300 may implement operations to detect when the requesting device no longer requires a communication channel and may return the bandwidth allocated to the requesting device back to available bandwidth.

Thus, the operations depicted in FIG. 4 enable a WLAN controller as depicted in FIG. 3 to reserve one or more communication channels from normal channel allocation processes implemented by the controller and, instead, to allocate the reserved communication channel(s) to one or more registered devices. These operations may facilitate management of a wireless networking environment in which network devices and network access points may be introduced into the networking environment abruptly and for specific tasks. By way of example, in a manufacturing environment shop floor devices or systems may be added introduced into the wireless networking environment for brief periods of time, e.g., for inspection purposes or the like. Registering these devices with the controller and allocating them to a reserved communication channel allows the devices to be added and removed from the network without requiring a complete reconfiguration of the WLAN environment to accommodate the bandwidth required by the device(s).

Figure 6:
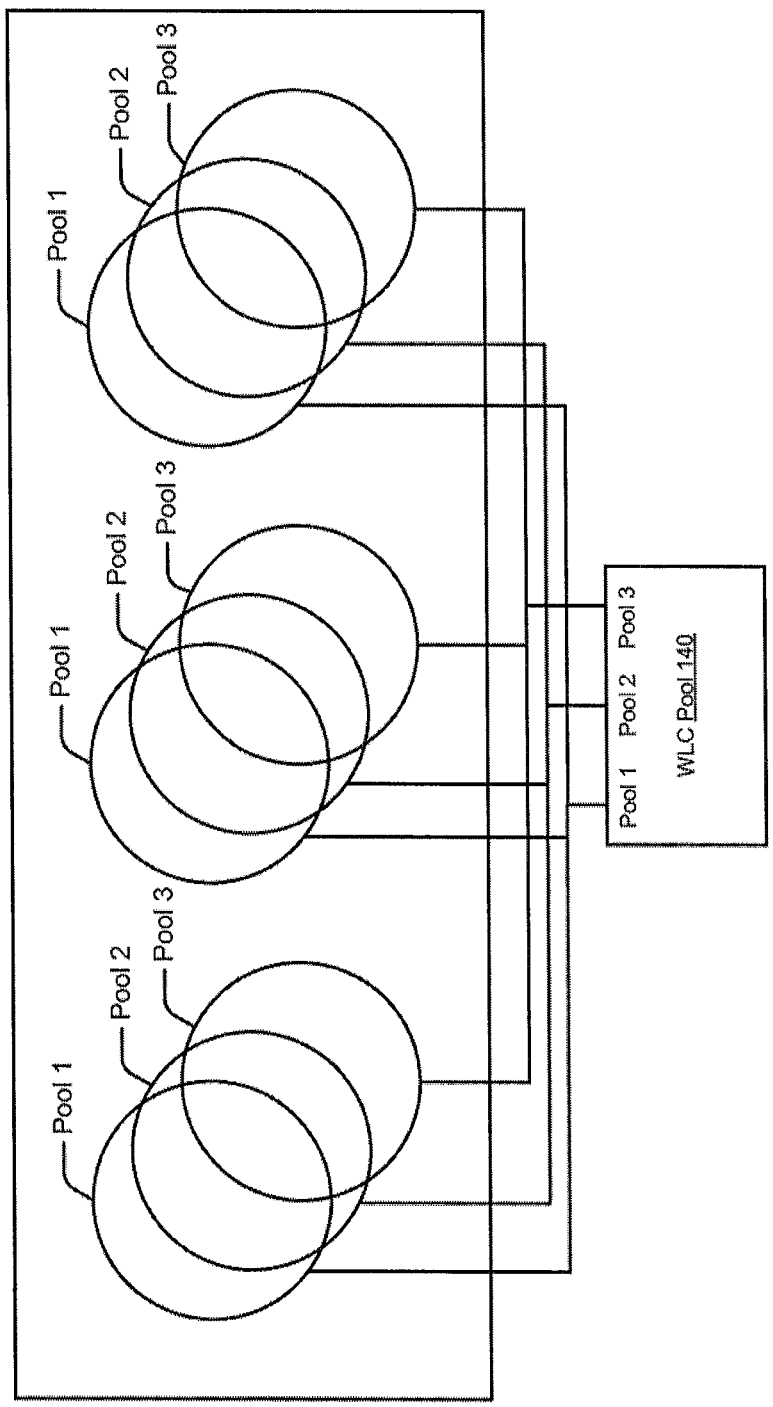
FIGS. 6-7 are schematic illustrations of channel allocation scheme in a WLAN environment, according to embodiments.
Figure 7:
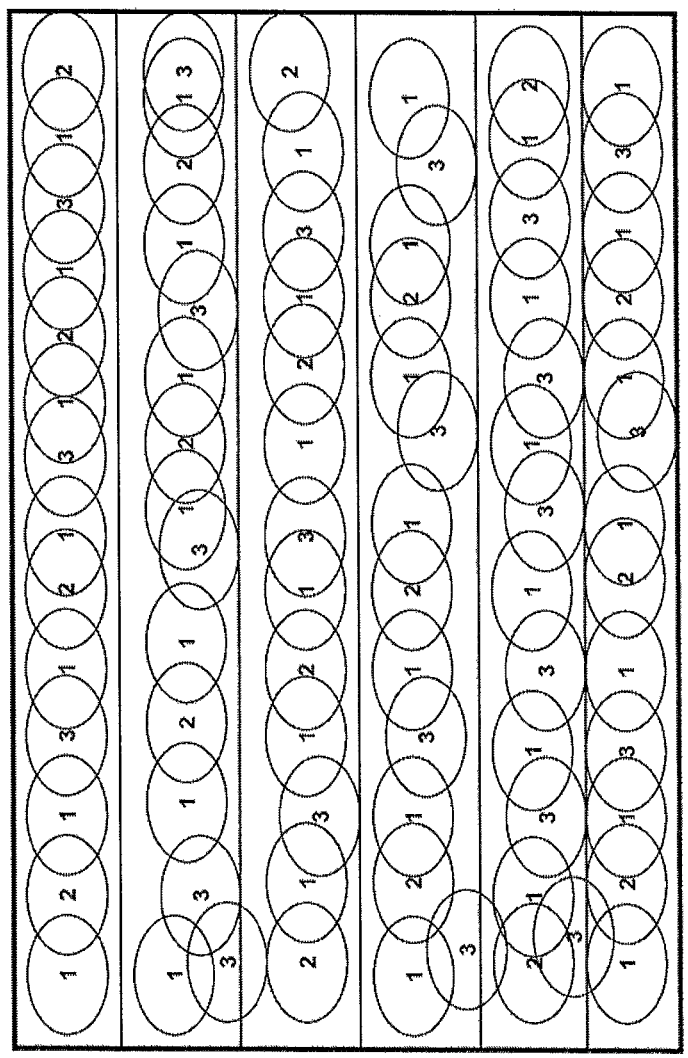

FIGS. 6-7 are schematic illustrations of channel allocation scheme in a WLAN environment, according to embodiments. FIG. 6 depicts an exemplary allocation of channels reserved to three designated pools, pool 1, pool 2, and pool 3. In some embodiments pool 1 may include channels 36, 40, 44, 48, 52, and 56, pool 2 may include channels 60, 64, and 149, and pool 3 may include channels 153, 157, and 161. The WLAN controller may implement a registration process in which an SSIS device is registered with the WLAN controller as a specified SSID device which operates using only one or more pools of designated communication channels. Other channel allocation schemes may be implemented.

FIG. 7 depicts an exemplary allocation of channels reserved to three designated pools in a WiFi infrastructure in a high-density area such as a multi-story building complex.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might-be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method comprising:
reserving, at a wireless local area network (WLAN) controller, a first reserved communication channel from a plurality of communication channels available for use in a wireless network, wherein the first reserved communication channel is withheld from a dynamic channel allocation process;
receiving, at the WLAN controller, a request from a first device for access to the wireless network; and
allocating the first reserved communication channel to the first device in response to a determination that the first device is included in a list of registered devices.

2. The method of claim 1, further comprising:
receiving a registration request at the WLAN controller from the first device, the registration request indicating a first network identifier of the first device; and
adding the first device and the first network identifier to the list of registered devices, wherein the list of registered devices is stored in a memory coupled to the WLAN controller.

3. The method of claim 1, further comprising:
monitoring an available bandwidth parameter associated with the first reserved communication channel; and
assigning a second reserved communication channel to the first device when the available bandwidth parameter does not satisfy a bandwidth requirement received from the first device.

4. The method of claim 1, further comprising reserving, at the WLAN controller, a plurality of reserved communication channels, wherein the plurality of reserved communication channels includes a plurality of non-overlapping communication channels, and wherein the plurality of reserved communication channels includes the first reserved communication channel.

5. The method of claim 1, wherein the list of registered devices comprises a list of network identifiers corresponding to the registered devices, and wherein the determination whether the first device is included in the list of registered devices comprises a determination whether a first network identifier received from the first device is included in the list of network identifiers.

6. The method of claim 5, wherein the list of network identifiers comprises a list of service set identifiers (SSIDs), and wherein the first network identifier is a first SSID.

7. The method of claim 1, wherein the first reserved communication channel is allocated to the first device based on a bandwidth request included in the request, and wherein the first communication channel satisfies the bandwidth request.

8. The method of claim 1, further comprising performing the dynamic channel allocation process at the WLAN controller in response to a determination that the first device is not included in the list of registered devices.

9. A wireless local area network (WLAN) controller comprising:
a processor; and
a memory coupled to the processor, the memory including instructions that, when executed by the processor, cause the processor to perform operations comprising:
reserving a first reserved communication channel from a plurality of communication channels available for use in a wireless network, wherein the first reserved communication channel is withheld from a dynamic channel allocation process;
receiving a request from a first device for access to the wireless network; and
allocating the first reserved communication channel to the first device in response to a determination that the first device is included in a list of registered devices.

10. The WLAN controller of claim 9, wherein the operations further comprise receiving a registration request from the first device, wherein the registration request indicates that the first device communicates via one or more designated communications channels, and wherein the list of registered devices is stored in the memory.

11. The WLAN controller of claim 9, wherein the operations further comprise withholding multiple reserved communication channels from the dynamic channel allocation process, and wherein the multiple reserved communication channels are designated into multiple pools of communication channels.

12. The WLAN controller of claim 9, wherein the operations further comprise:
monitoring an available bandwidth parameter associated with the first reserved communication channel; and
assigning a second reserved communication channel to the first device when the available bandwidth parameter does not satisfy a bandwidth requirement received from the first device.

13. The WLAN controller of claim 9, wherein the operations further comprise reserving a plurality of reserved communication channels, wherein the plurality of reserved communication channels are non-overlapping communication channels, and wherein the plurality of reserved communication channels includes the first reserved communication channel.

14. The WLAN controller of claim 13, wherein the operations further comprise allocating a second reserved communication channel of the plurality of reserved communication channels to a second device in response to a determination that the second device is included in the list of registered devices.

15. A non-transitory computer-readable medium storing instructions that, when executed by a processor, cause the processor to perform operations comprising:
reserving, at a wireless local area network (WLAN) controller, a first reserved communication channel from a plurality of communication channels available for use in a wireless network, wherein the first reserved communication channel is withheld from a dynamic channel allocation process;
receiving, at the WLAN controller, a request from a first device for access to the wireless network; and
allocating the first reserved communication channel to the first device in response to a determination that the first device is included in a list of registered devices.

16. The non-transitory computer-readable medium of claim 15, wherein the operations further comprise:
receiving, at the WLAN controller from the first device, a first registration request, the first registration request indicating a first network identifier of the first device; and
adding the first network identifier to the list of registered devices, wherein the list of registered devices comprises a list of network identifiers corresponding to the registered devices, and wherein the list of registered devices is stored in a memory coupled to the WLAN controller.

17. The non-transitory computer-readable medium of claim 15, wherein the operations further comprise:
monitoring an available bandwidth parameter associated with the first reserved communication channel; and
allocating a second reserved communication channel to the first device when the available bandwidth parameter does not satisfy a bandwidth requirement received from the first device.

18. The non-transitory computer-readable medium of claim 15, wherein the operations further comprise reserving a plurality of reserved communication channels, wherein the plurality of reserved communication channels is a plurality of non-overlapping communication channels, and wherein the plurality of reserved communication channels includes the first reserved communication channel.

19. The non-transitory computer-readable medium of claim 15, wherein the operations further comprise designating multiple logical pools of reserved communication channels, each logical pool of reserved communication channels containing one or more reserved communications channels, and wherein the first device is allocated reserved communication channels from one of the multiple logical pools of reserved communication channels.

20. The non-transitory computer-readable medium of claim 15, wherein the operations further comprise:
allocating reserved communication channels to one or more registered devices using a channel allocation algorithm based on a receive signal strength indicator (RSSI); and
dynamically allocating one or more non-reserved communications channels using the dynamic allocation process.

* * * * *